May 2, 1933.  M. J. GRAHAM  1,906,461
GAUGE FIXTURE
Filed July 9, 1928
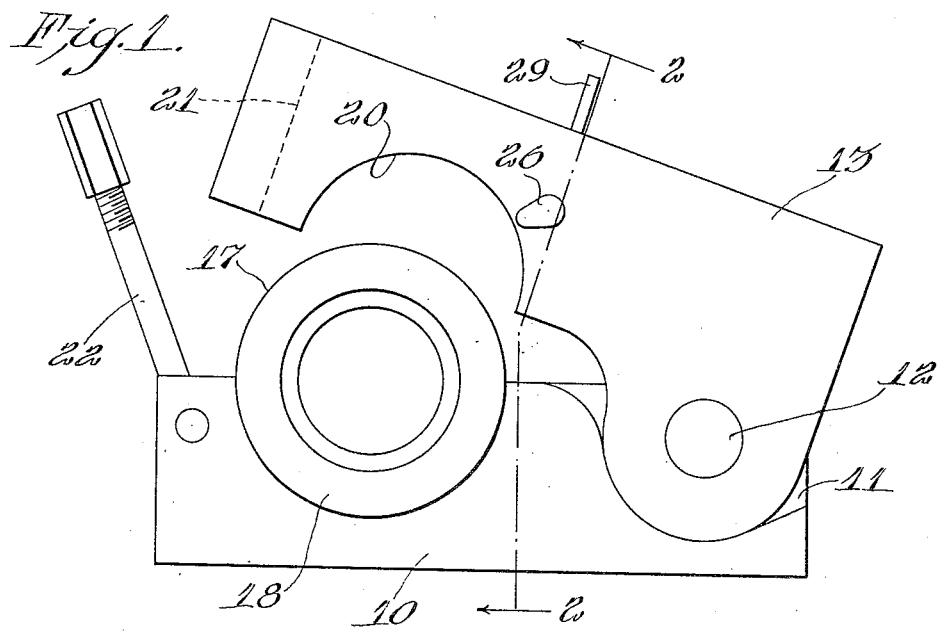
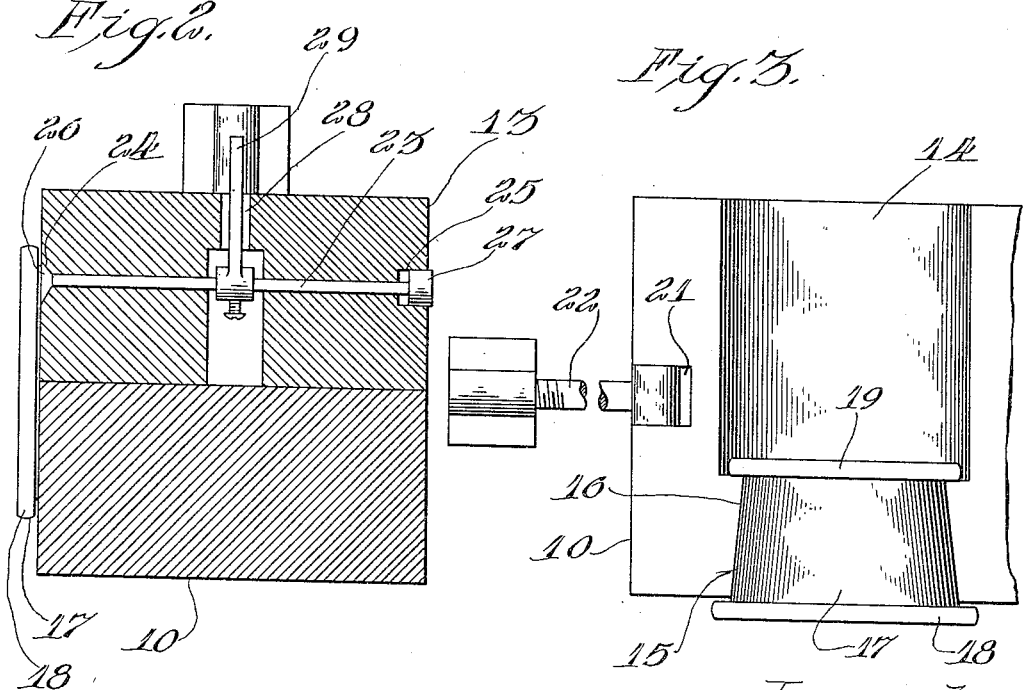
Inventor.
Michael J. Graham.
By H.P. Doolittle
Atty.

Patented May 2, 1933

1,906,461

UNITED STATES PATENT OFFICE

MICHAEL J. GRAHAM, OF CHICAGO, ILLINOIS, ASSIGNOR TO INTERNATIONAL HARVESTER COMPANY, A CORPORATION OF NEW JERSEY

GAUGE FIXTURE

Application filed July 9, 1928. Serial No. 291,448.

The invention relates to a fixture for gauging the accuracy of machined work.

In the manufacture of tapered roller bearings, it is common practice to turn out the tapered cone pieces for tapered roller bearings on a screw machine which, by means of a cutting tool, produces these tapered cones from tubular stock. The work coming from this machine is a rough cone and it is advisable to gauge the taper and outer diameter of this work at intervals to make sure that the work produced comes within certain prescribed manufacturing tolerances. More particularly, therefore, the invention relates to a fixture for gauging rough formed cone pieces for tapered roller bearings.

The objects of the invention are to provide a simple and cheap fixture which can be utilized to gauge the taper and outer diameter of a rough formed cone for a tapered roller bearing; and, to provide such a fixture including a simple means embodying a feeler and an indicator for causing this gauging operation to be accurate and simple.

Briefly, these desirable objects are accomplished in the illustrative embodiment of the invention hereinafter to be described in which the gauge is in the nature of a vice fixture embodying a base block provided with a work receiving pocket, and a cover fixture having a complementary pocket; there being means for securing the two blocks together in a manner to clamp the work therebetween in such a fashion that the flange at the wide end of the cone piece will be exposed at the side of the blocks where it can be engaged by a feeler means associated with one of the blocks. Means is provided in the feeler device for sliding the same to engage the flange of the work and an indicator means is also provided to serve as a telltale.

In the accompanying sheet of drawing illustrating a practical form of the invention, it will be seen that,—

Figure 1 is a general side elevational view with the fixture partly open;

Figure 2 is a vertical sectional view through the vice fixture as seen along the line 2—2 shown in Figure 1 when looking in the direction of the arrows; and Figure 3 is a vertical plan view of the base block per se and the clamping means associated therewith.

The fixture embodies a base block 10 hollowed out at its rear end as at 11 to receive a pivot pin 12 on which is mounted a cover block 13. The base block is hollowed out, as at 14, to save material and to make the fixture as light as possible for easy handling thereof, and at one end is a wall 15 formed with a tapering groove or pocket 16 designed as a master groove to receive exactly an accurately formed tapered cone or piece of work 17 intended for use in a tapered roller bearing, which piece of work is the rough production of a screw machine and embodies at its large end a thrust flange 18 and at its small end another thrust flange 19.

The cover block is formed with a complementary pocket or groove 20 and at its front end, a cut out 21.

The front end of the base block 10 pivotally carries a lock lever 22 so that when a piece of work 17 rests in the groove of the base block 10, the cover block 13 may be hinged downwardly to nest with its complementary groove 20 over the work and then, by means of the lever 22 fitting the cut out 21, the base and cover blocks may be securely locked together to clamp the work 17 therebetween with the flange 18 exposed at the side of the blocks, as shown in the drawing.

As the grooves 16 and 20, and especially the groove 16, are accurately formed for the requisite size, it is obvious that if the cone does not exactly fit, the operator knows that the taper of the cone is not accurately formed. This the operator will know by sight, as any inaccuracy greater than the prescribed tolerance is readily seen by mere inspection; or, to be somewhat more accurate, the master cone surfaces may be painted or rubbed with Persian blue, which will leave an imprint on the work to show exactly where the work's surface does not conform with the surface of the master cone parts. This first step is of course practised with the cover 13 folded back; that is, only the lower half of the fixture, as shown in Figure 3, being used.

However, for the sake of making an accurate gauge or measurement of the work, a feeler and indicator means is preferably provided, which may take the form of a slidable rod 23 extending through a lateral bore in the cover block 13, as best shown in Figure 2, there being a pocket 24 at one end of the bore and another pocket 25 at the other end of the bore. The rod at that end adjacent the flange 18 of the work carries a feeler head 26 and at the other end remote from the flange 18, an indicator head 27. A central vertical bore 28 is also provided to communicate with the lateral bore heretofore described, and in this manner the rod 23 is enabled to have secured thereto an arm 29 extending vertically upwards and projected above the upper surface of the cover block 13. The vertical bore 28 is sufficiently large to permit the arm 29 to be moved laterally to reciprocate or shift the rod 23 so that the feeler head 26 can be made to engage the flange 18. The parts are so proportioned as to size that when the head 26 engages the edge of the flange 18, the exposed indicator surface of the head 27 will exactly lie flush with the surface of the side wall of the cover block 13. Thus, the operator can see with his eye, or else feel with his fingers, whether the end of the head 27 is flush with the side wall of the cover block 13, and if these parts are flush the operator then knows that the cone is accurate as to its outer diameter and as to its taper. In performing this gauging operation, the check up is always made from the large end of the cone. The inner side of the flange 18 should be moved then as close to the smooth side surface of the fixture as its size will permit, as shown in Figure 3, with the cover open. Next the cover is clamped to lock the part in place. In Figure 2, these adjoining surfaces do not quite meet and consequently, when the feeler 26 is moved to contact the flange 18, the telltale 27 will have its end surface lie flush with the adjacent end surface of the fixture and the operator, by rubbing the end of one of his fingers over the part 27, will feel that the outer diameter of the cone is correct. The part, therefore, passes inspection. The part 23 must quite obviously be of exactly the prescribed length to give an accurate gauging. Now, if the cone is too large, it cannot be initially positioned in the pockets with its flange 18 so close to the side surface of the block. Thus, the rod 23 must be moved over farther if the head 24 is to engage the flange, which leaves the feeler end surface of part 27 inside the other side surface of the block. Conversely, when the cone to be gauged is too small, it will be run farther into the pockets, so that the flange 18 might even contact the adjacent surface of the block. As a result the member 23 cannot be slid at all toward the flange, causing the feeler head 27 to project outwardly of its complementary side of the block.

From this description, the operation and use of the vice fixture of this invention will be clear and need not further be gone into. Of course, it is not necessary to so gauge every cone coming from the screw machine, the thought being that this gauge fixture will be used only at certain intervals to check the size and taper measurements of the rough cones coming from the screw machine, because later on when the cone pieces have been heat treated, ground and finished, they will be subjected to other gauging operations to give them a final check prior to their assembly in a completed roller bearing.

It is the intention to cover all such changes and modifications of this invention as do not materially depart from the scope of the invention as is indicated in the subjoined claims.

What is claimed as new is:

1. A gauge fixture having a base block formed with a work receiving pocket, a cover block pivotally connected to the base block and having a complementary work receiving pocket, means for securing the blocks together to clamp a piece of work therebetween, said cover block having therein a bore terminating at each end in a pocket, a rod slidable in the bore and having seated in each pocket a head, one of the heads being a work feeler head and the other an indicator head, said cover block also having a vertical bore, and an arm in the vertical bore connected to the rod for sliding the same, said arm projecting above the cover block.

2. A gauge fixture for a piece of work having a flange, said fixture comprising a base block formed with a pocket adapted to receive the work with the flange thereof disposed alongside a face of the block exteriorly of the pocket, a cover block pivotally connected to the base block, one of said blocks having a bore and a head receiving pocket at one end of said bore, said cover block having a work receiving pocket, means to secure the base and cover block together to clamp the work, a member reciprocable through said bore, means connected to said member whereby said member may be moved in said block, said member carrying at one end a feeler head to engage the flange of the work, and a telltale head at the other end of the member, said telltale head being seated in said head receiving pocket.

3. A gauge fixture for a piece of work having a flange, said fixture comprising a base block formed with a pocket adapted to receive the work with the flange thereof disposed alongside a face of the block exteriorly of the pocket, a cover block pivotally connected to the base block, the cover block having a bore and a head receiving pocket at one end of said bore at the side of the block, said cover block having a work receiving pocket, means to releasably secure the base and cover blocks together to clamp the work, a member reciprocable through said bore in the cover block, means whereby said member may be moved in said cover block, said member being provided at one end with a feeler head to contact the flange of the work, and a telltale head at the opposite end of the member, said telltale head being located in said head receiving pocket.

In testimony whereof I affix my signature.

MICHAEL J. GRAHAM.